Aug. 29, 1939. J. M. PAINE 2,171,404
REVOLVING HOIST
Filed July 21, 1937 3 Sheets-Sheet 2
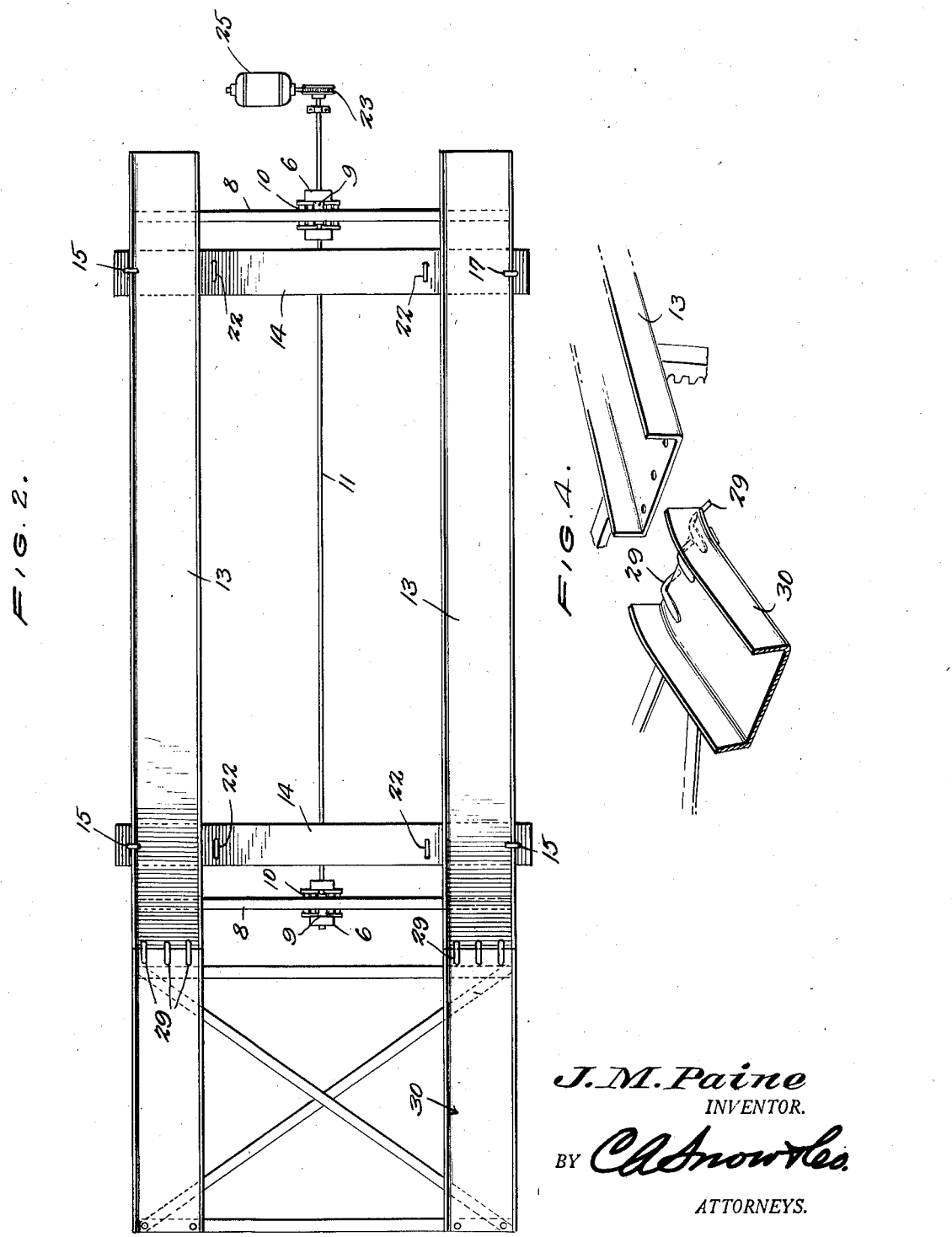

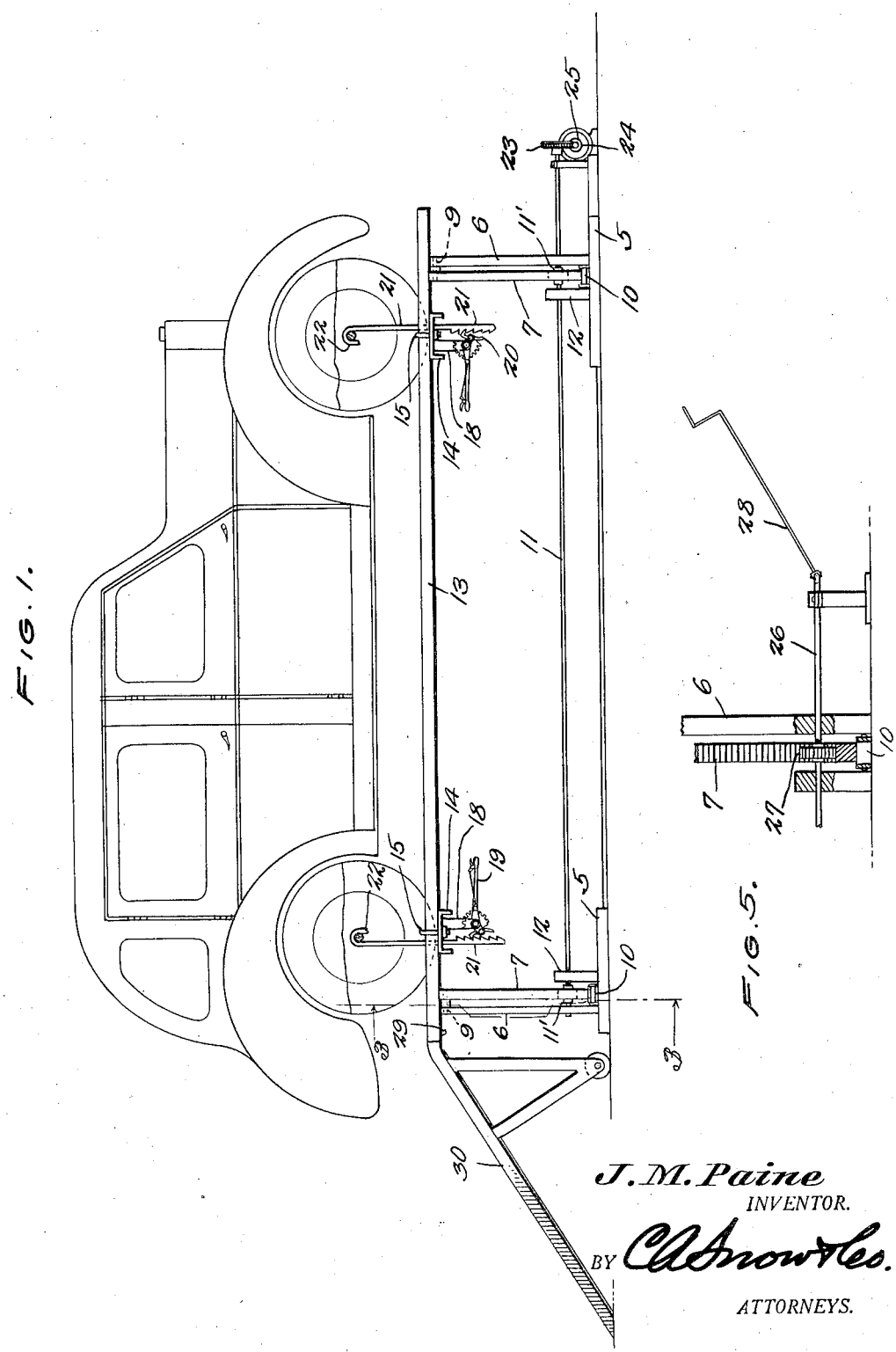

Aug. 29, 1939.                J. M. PAINE                 2,171,404
                            REVOLVING HOIST
              Filed July 21, 1937        3 Sheets-Sheet 3
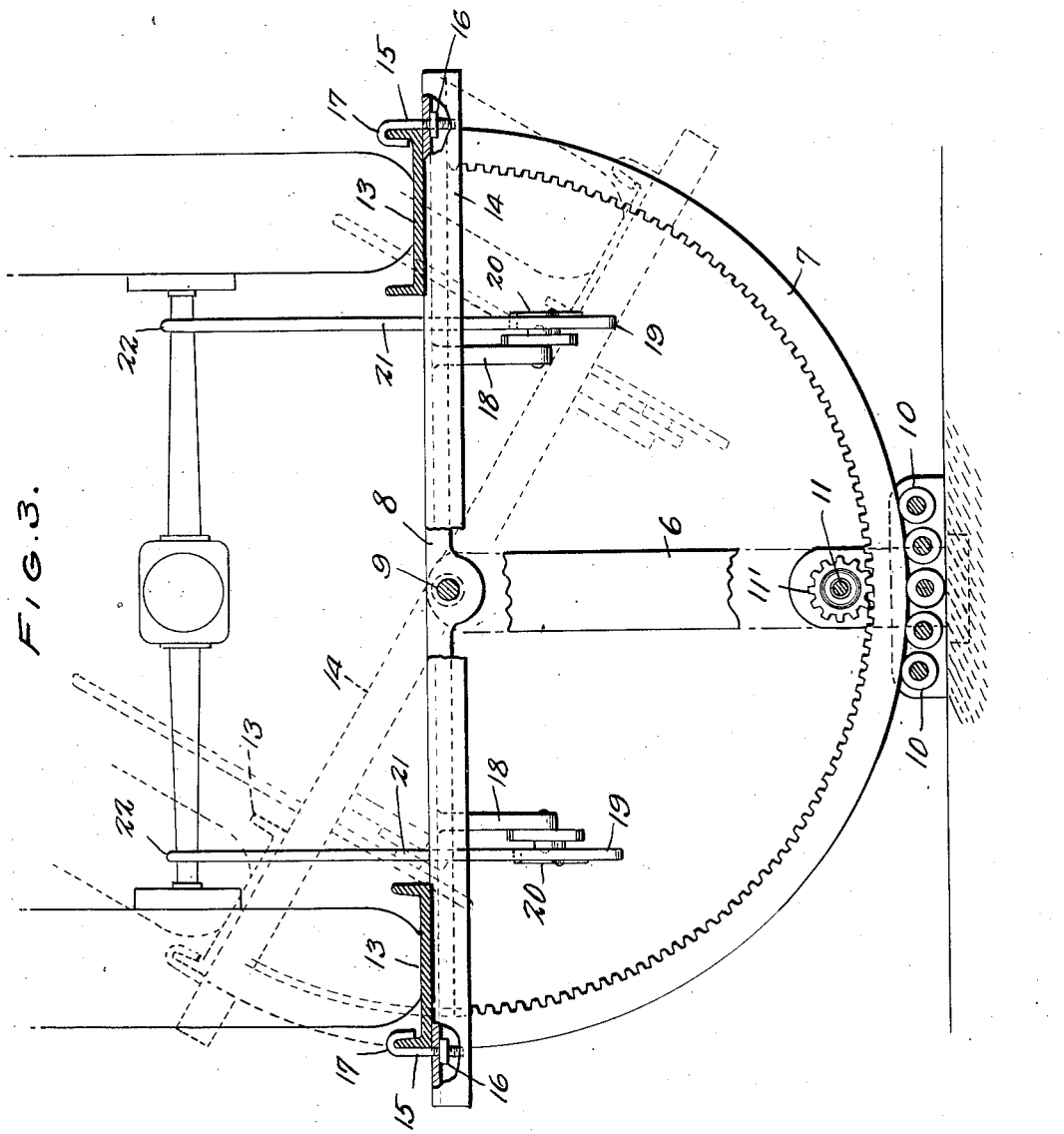
J. M. Paine
    INVENTOR.
BY C.A.Snow&Co.
    ATTORNEYS.

Patented Aug. 29, 1939

2,171,404

UNITED STATES PATENT OFFICE 2,171,404

REVOLVING HOIST

James M. Paine, Harlingen, Tex.

Application July 21, 1937, Serial No. 154,871

1 Claim. (Cl. 214—1)

This invention relates to motor vehicle lifts or racks, designed for use in supporting motor vehicles above the ground surface, whereby a motor vehicle may be tilted to various angles and repaired or serviced with facility.

An important object of the invention, is to provide a device of the character which may be held in various angular or tilted positions, to the end that the mechanic working on the chassis or running gear, may stand erect and work in an upright position eliminating the necessity of a workman reaching above his head in an awkward position in order to make repairs.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of a lift or rack constructed in accordance with the invention, illustrating a motor vehicle positioned thereon prior to the tilting of the rack.

Figure 2 is a plan view of the rack or lift.

Figure 3 is a transverse sectional view taken on line 3—3 of Figure 1.

Figure 4 is a view illustrating the detachable ramp used with the rack or lift.

Figure 5 is a view illustrating the hand controlled operating means.

Referring to the drawings in detail, the lift or rack embodies base members 5 which may be anchored or secured to a supporting surface in any suitable or well known manner.

Rising from the base members 5, are uprights 6 which provide supports for the arcuate shaped rack bars 7 that have their ends connected by the bars 8 which are pivotally connected to the upper ends of the uprights 6, at 9.

As clearly shown by the drawings, these rack bars 7 are spaced an appreciable distance apart, so that the wheels of the vehicle positioned thereon will rest between the bars 7, affording ample room for a mechanic to work on the vehicle.

The base members 5 also support a plurality of roller bearings 10 on which the curved outer surfaces of the bars 7 rest providing a support for the bars 7 which will permit of free rotary movement of the bars 7, when it is desired to tilt the lift or rack to gain ready access to a particular part of the vehicle thereon.

Extending throughout the length of the lift or rack, is an operating shaft 11 which is mounted on the base members 5 and has pinions 11' meshing with the teeth of the rack bars 7 whereby the rack bars 7 are operated to tilt the frame of the lift laterally.

Secured to the bars 8, and extending longitudinally of the lift, are spaced track sections 13 on which the vehicle to be repaired or serviced, is run. Channel bars 14, are secured to the track sections 13, by means of the hook members 15, that extend through openings in the channel bars 14, where they are secured by means of nuts 16, the hook portions 17 thereof being positioned over flanges of the track sections 13, as shown by Figure 3 of the drawings. Thus it will be seen that due to this construction, the channel bars 14 are mounted for adjustment longitudinally of the track sections 13.

Depending from the bars 14 are arms 18 on which the levers 19 are pivotally mounted, the levers 19 carrying pawls 20 that engage the teeth of the rods 21 formed with hooks 22 at their upper ends adapted to fit over the axles of the vehicle positioned on the lift or rack. Thus it will be seen that when a motor vehicle has been run onto the lift or rack, it may be securely held in position thereon, to tilt or move with the lift or rack, and since the bars 14 which carry the vehicle securing rods 21, are adjustable, the rods 21 may be moved to engage the axles of vehicles of various lengths.

At one end of the shaft 11 is a gear 23 engaged by the worm 24 of the motor shaft 25, with the result that when the motor is set in motion, rotary movement will be transmitted to the shaft to tilt the lift or rack in a manner as described.

As clearly shown by Figure 5 of the drawings, the power shaft 26 is supplied with a pinion 27 meshing with the teeth of curved rack bars 7. A hand operated shaft 28 is connected to one end of the shaft 26, whereby the power shaft may be operated, should the lift or rack be installed at a place where electric current for operating a motor, is not available.

Openings are formed in the ends of the track sections, and are designed to accommodate the fingers 29 extending from the upper ends of the portable ramp 30, which may be moved to a position as shown by Figure 2 of the drawings, permitting a motor vehicle to be moved to a position onto the tracks of the lift or rack.

From the foregoing it will be seen that due to the construction shown and described, a vehicle secured on the lift or ramp, may be readily tilted laterally to a position as shown by Figure 3 of the drawings, where a mechanic may have easy access to the various parts of the vehicle to the end that repairing and servicing of the vehicle may be carried out with facility.

Having thus described the invention, what is claimed is:

A motor vehicle tilting device comprising spaced supports, uprights rising from the supports, a plurality of spaced rollers on each support, the upper surfaces of the rollers being disposed in a curved line, curved rack bars resting on the rollers, gears mounted on the supports and meshing with the teeth of the rack bars, and adapted to operate the rack bars, tilting the rack bars laterally, transversely disposed supporting bars connected with the upper ends of the curved rack bars, means for pivotally connecting the supporting bars to the uprights at points intermediate the ends of the supporting bars, track sections mounted on the supporting bars and on which motor vehicles are held, and means for securing a motor vehicle on the track sections.

JAMES M. PAINE.